United States Patent [19]

Matsumoto

[11] Patent Number: 5,826,233

[45] Date of Patent: Oct. 20, 1998

[54] SPEECH-INPUT CONTROL DEVICE

[75] Inventor: Yoshiyuki Matsumoto, Wako, Japan

[73] Assignee: Honda Giken Kogyo Kabushiki Kaisha, Tokyo, Japan

[21] Appl. No.: 857,042

[22] Filed: May 15, 1997

[30] Foreign Application Priority Data

May 16, 1996 [JP] Japan .................................. 8-158766

[51] Int. Cl.⁶ .................................................. G10L 3/00
[52] U.S. Cl. ...................... 704/275; 704/270; 704/251; 704/231
[58] Field of Search .................................. 704/231, 246, 704/251, 270, 275

[56] References Cited

U.S. PATENT DOCUMENTS

| | | | |
|---|---|---|---|
| 4,701,851 | 10/1987 | Bass et al. | 364/419 |
| 4,777,617 | 10/1988 | Frisch et al. | 364/900 |
| 5,651,678 | 7/1997 | Phillips | 434/170 |
| 5,680,511 | 10/1997 | Baker et al. | 395/2.66 |
| 5,682,539 | 10/1997 | Conrad et al. | 395/759 |

*Primary Examiner*—David R. Hudspeth
*Assistant Examiner*—Michael N. Opsasnick
*Attorney, Agent, or Firm*—Lyon & Lyon LLP

[57] ABSTRACT

A speech input control device for recognizing an input speech and giving a specified control instruction to a target device, which device is provided with a portion for detecting that a word inputted by voice is unregistered in a voice word dictionary, a portion for extracting a feature of the detected unregistered words and storing the extracted feature, a portion for counting the input frequency of each unregistered word and renewably storing the counted input frequency, and a portion for changing a response message in response to an unregistered word depending to its input frequency and which is capable of adaptively responding by avoiding outputting the same response message such as "The input cannot be recognized" and "Correct input is required" or the like whenever the user's meaningless word or habitual phrase is inputted thereafter.

2 Claims, 2 Drawing Sheets

SPEECH-INPUT CONTROL DEVICE

BACKGROUND OF THE INVENTION:

The present invention relates to a speed-input control device for recognizing an input speech and giving a specified control instruction to a target (objective) device to be controlled.

Recently, there has been developed an interactive speech-input control system that can be applied as a human-interface for recognizing voice-inputted words and judging a necessary control content, outputting a voice message to a person and giving a specified control instruction to a target device that may be a variety of devices, e.g., car-mounted navigators, air-conditioners, audiovisual devices and the like.

In the above-mentioned speech-input control device, speech recognition is conducted usually by extracting features (e.g., phonemes) of an input speech, comparing the extracted features of respective words with basic features (phonemes) registered in a voice word dictionary, finding matches, each of which is most similar and has a differential feature value less than a specified value, and determining the found words as the words of the speech. Every time when any unrecognizable word is inputted, the system outputs a message "the input word is unrecognizable" and a message "a correct input is required".

The problem to be solved by the present invention exists in that whenever one unconsciously utters meaningless vocal sounds, e.g., "uh", "ahem", "Eh", or the like or has a habit of saying (e.g., "well, ..."), which are, of course, not registered in a voice word dictionary but unnecessary to be recognized, the above-mentioned conventional system must output a message "the input word is unrecognizable" and a message "a correct input is required".

In interactive talking with a speech-input control device, users may utter a variety of meaningless vocal sounds and words with different frequencies. A series of processing operations is interrupted for repeating the same message "The input word is unrecognizable" and "A correct input is requested" in response to an input of a meaningless vocal sound or word, impairing the effective usage of the system. This may also unnecessarily strain users in speaking to the speech-input control system.

SUMMARY OF THE INVENTION

In contrast to the above-mentioned prior art which outputs the same messages, such as, "voice input is unrecognizable" and "Correct input is requested" whenever the user's meaningless vocal sounds or habitual saying is inputted, the present invention provides a speech-input control device which is provided with unregistered word detecting means for detecting each unregistered input voice word in a voice word dictionary, storing means for storing the detected unregistered voice word together with its feature, unregistered word input-frequency counting and storing means for incrementally counting an input-frequency of the input unregistered word and renewably storing the unregistered word input-frequency, and response changing means for changing a response to the input unregistered word according to the counted input-frequency of the word and which is, thereby, capable of changeably taking an adaptive response to the above-mentioned voice input according to the frequency of the inputted unregistered word.

DESCRIPTION OF PREFERRED EMBODIMENTS

Figure 1:
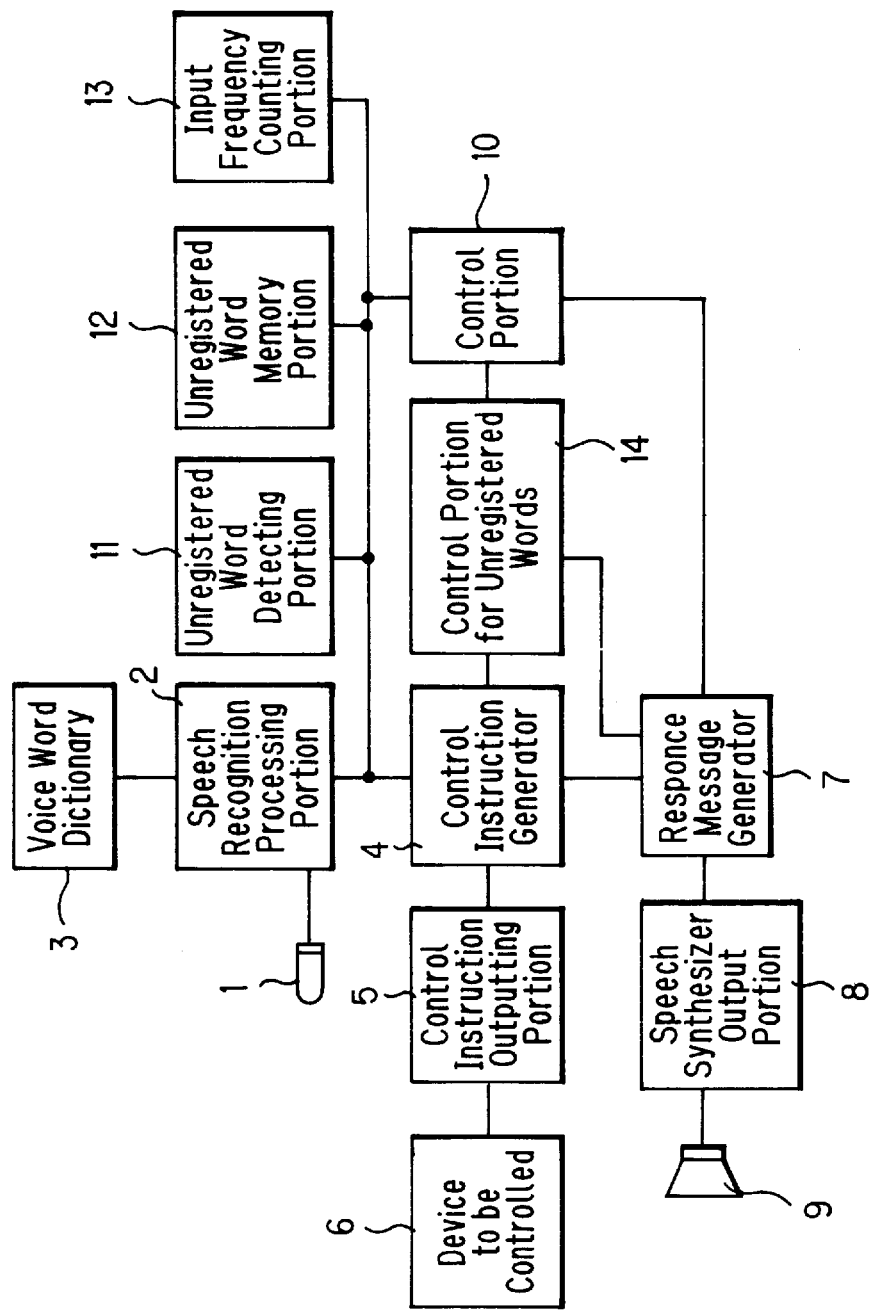
FIG. 1 is a block diagram of a speech-input control device embodying the present invention.

Referring to FIG. 1, a speech-input control device according to the present invention is mainly composed of: a speech recognition processing portion 2 for extracting features of each of the words inputted by the voice of a user through a microphone 1, comparing the extracted features of each input word with stored features of words previously registered in a voice word dictionary, finding matches, each of which is most similar and has a differential feature value less than a specified value and recognizing found words as the words of the speech; a control instruction generator 4 for generating a specified control instruction in response to the recognized word; a control instruction outputting portion 5 for giving the generated control instruction to an objective device 6 to be controlled; a response message generator 7 for generating a message for informing the user of the content of the control instruction and a message necessary for determining a procedure of executing the control instruction; a voice synthesizing portion 8 for outputting the generated messages through a speaker 9 and a control portion 10 for controlling the whole system.

Objective devices 6 to be controlled may be vehicle-mounted devices such as a navigator, air conditioner and/or audiovisual device.

The voice word dictionary 3 contains phonetic features data of registered words necessary for operating the objective device 6, .e.g, Yes, No, Enlarge, Reduce, Target Setting, Menu, Up, Down, Left, Right, Cancel, Return, Home, Instruction Start, TV, Air Conditioner, ON, OFF, Select Music, One, Two, three, etc., registered place and target names necessary for selecting maps and target points, e.g., Tokyo, Kanagawa, Saitama, Chiba, Shinagawa, Naerima, Adachi, Yokohama, Kawasaki, Kamakura, Urawa, Ohomiya, Tokorosawa, Disney Land, Royal Palace, Toshima Amusement Park, Meiji Shrine, Teikoku Hotel, Haneda Airport, etc.

For example, if a user speaks in Japanese, "Kakudai" (which means "Enlarge" in English), his voice is received through a microphone 1 and under the control of the control portion 10 by the speech recognizing portion 2 which extracts features of the inputted voice, i.e., a series of phonemes "k.a.k.u.d.a.i.", compares the features with contents of the voice word dictionary 3 and finds therein a match with a previously registered series of phonemes "k.a.k.u-.d.a.i." and recognizes that the inputted voice message is "Kakudai".

The recognition result is given to the control instruction generator 4 which in turn generates a control instruction data for requesting enlarging a map displayed on a screen of a navigator. The control instruction outputting portion 5 selectively outputs the control instruction "Enlarge a map" to the navigator that is the object 6 to be controlled in this case.

At the same time, the generated control instruction is given to the response message generator 7 whereby specified response message data for enlarging a map is prepared. The voice synthesizing outputting portion 8 outputs a response message "Map is enlarged" by voice through the speaker 9.

The above-mentioned construction is the same as the conventional voice-input control device.

In the speech-input control device according to the present invention, the control of the control portion 10 further controls, as shown in FIG. 1, an unregistered word detecting portion 11 for detecting in an input speech a word that is unregistered in the voice word dictionary 3, an unregistered word memory portion 12 for storing the detected unregistered word together with its feature pattern, an input-frequency counting portion 13 for counting input frequency of each unregistered word and renewably storing the counted input frequency of each unregistered word, and an unregistered word response control portion 14 for changing a responding program according to the counted frequency of an inputted unregistered word when said word was just inputted.

Figure 2:
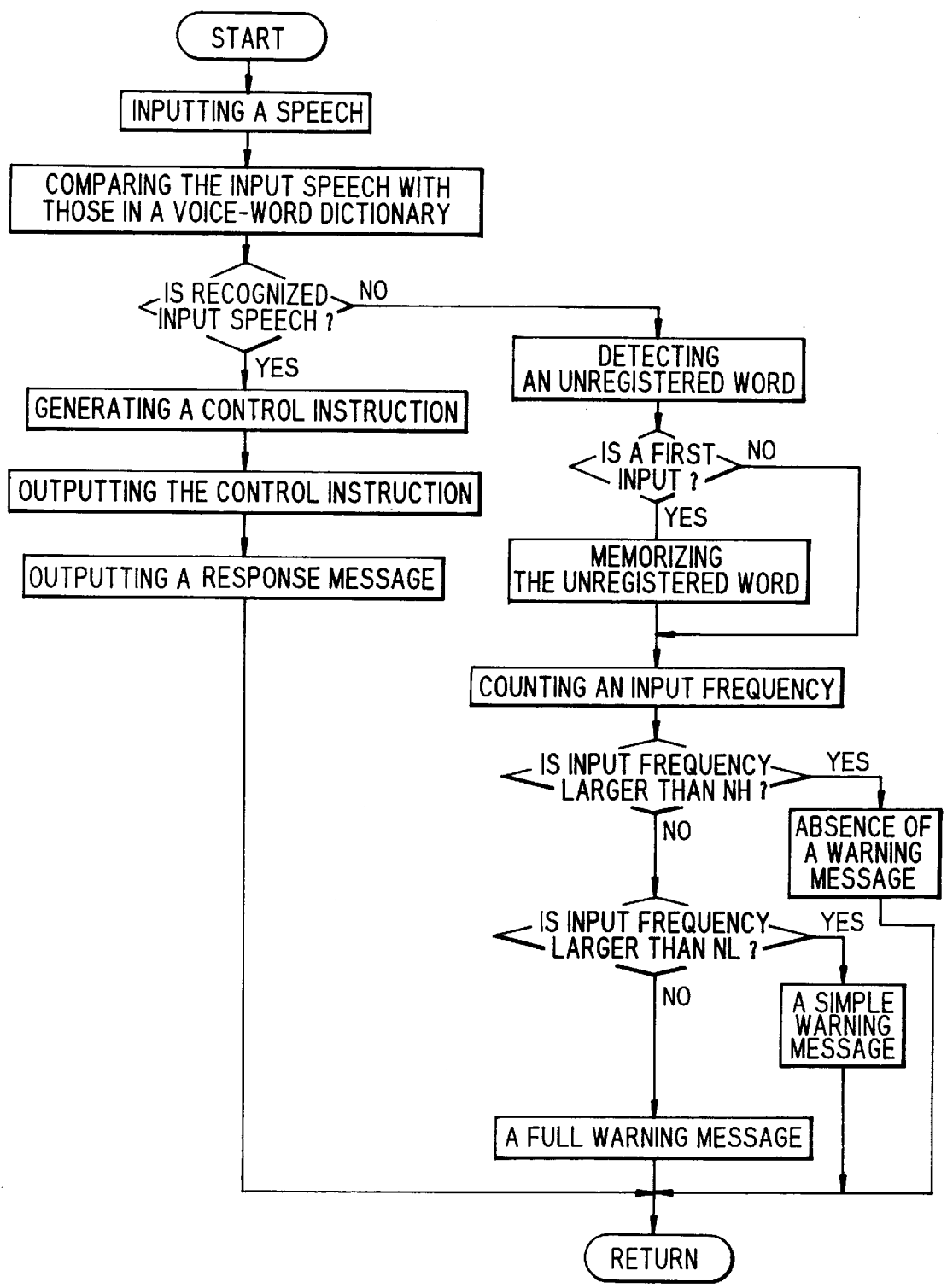
FIG. 2 is a flow chart describing an example of control processing by the speech-input control device shown in FIG. 1.

The controlled operation of the speech-input control device according to the present invention will be described below with reference to a flow chart of FIG. 2.

With a voice input (Step S1), the control portion 10 starts the speech recognition procedure: a feature value is extracted from a voice-inputted word and compared with a feature value of each word registered in voice word dictionary 3 (Step S2).

The unregistered word detecting portion 11 judges whether the voice-inputted word is recognized or not (Step S3). If the word could not be recognized, it is detected as an unregistered word (Step S7).

On the contrary, when the voice-input word is recognized, a specified control instruction according to the recognized voice-inputted word is generated (Step S5) and outputted to an objective device (Step S6). At the same time, a specified response message corresponding to the control instruction is also outputted to the user (Step S6A).

The detected unregistered word is examined as to whether it has been recorded in the unregistered word memory portion 12 or not (Step S8). If not, the unregistered word together with its feature value is stored in the unregistered word memory portion 12 (Step S9). At the same time, the input frequency counting portion 13 counts 1 and memorizes 1 as the input frequency of said word (Step S10).

If the unregistered word already has been recorded in the unregistered word memory portion 12, the input frequency counting portion 13 renews the record of input-frequency of the word with an increment of 1 (Step S10).

Every time there is any inputted unregistered word, the speech-input control device adds 1 to the corresponding input-frequency record and, after working for a certain period, may have a number of records of inputted unregistered words and their input frequencies, for example, frequencies "12" (Uh), "8" (Uh-Uh), "6" (Once more), "4" (No good) and so on in the counting portion 13. Namely, the speech input device has learned the user's speaking manner, including meaningless words and favorite words he or she unconsciously speaks.

When any unregistered word is detected, the unregistered-word response control portion 14 makes a judgment of whether the input-frequency value of said unregistered word is not less than an upper preset threshold value $N_H$ (e.g., 10) (Step S11).

If the input frequency value of the unregistered word is equal to or more than the upper threshold value $N_H$, the unregistered-word response control portion 14 ignores the unregistered word and does not give any warning message (Step S12).

If the input frequency value of the unregistered word is less than the upper threshold value $N_H$, the unregistered-word response control portion 14 makes another judgment of whether the input-frequency value of said unregistered word is not less than a lower preset threshold value $N_L$ (e.g., 5) (Step S13).

If the input frequency value of the unregistered word is equal to or more than the lower threshold value $N_L$, the unregistered-word response control portion 14 gives an instruction "Simple warning" to the response message generator 7 (Step S14).

According to the instruction given by the unregistered-word response control portion 14, the response message generator 7 (Step S14) generates a short message, e.g., "Say Differently", which is then outputted through the speaker 9.

If the input frequency value of the unregistered word is less than the lower threshold value $N_L$, the unregistered-word response control portion 14 gives an instruction "Full warning" to the response message generator 7 (Step S15).

According to the instruction given by the unregistered-word response control portion 14, the response message generator 7 (Step S14) generates full message, e.g., "An unregistered word is inputted. Please say differently", which is then outputted through the speaker 9.

When the user speaks meaningless word, e.g., "Eeto", the speech recognition portion 2 extracts a series of phonemes "e.e.t.o." as a feature pattern of the inputted word and compares it with each feature pattern previously registered in the voice word dictionary 3. In this instance, the speech recognition portion 2 fails in recognition of the word and the unregistered word detecting portion 11 detects said word as an unregistered word.

In case the word "Eeto" is input for the first time, the word "Eeto" together with the series of phonemes "e.e.t.o." is stored in the unregistered word memory, its input-frequency is counted as "1" and the full warning message is outputted. Every time the user thereafter utters "Eeto", the full warning will be given until the input frequency of the word reaches the lower threshold value $N_L$. Further, the simple warning will be given until the input-frequency of the word reaches the upper threshold value $N_H$. When and after the input-frequency of the word reaches the upper threshold value $N_H$, the speech-input control device judges that there is no use giving the warning to the user and ignores voice input "Eeto" without giving any message.

According to the present invention, the speech-input control device can learn that a user has an inclination to speak meaningless words and favorite phrases or habitually used words when giving an instruction to the device and will come to adaptively respond to his or her inclination. Accordingly, the speech-input device need not unnecessarily interrupt the control processing operation to respond to the user's meaningless word or habitual phrase inputted by voice and develops to the point that it does not give the warning message that would be straining the user, thus improving the working efficiency.

The speech-input control device according to the present invention can adaptively change the way of responding to unrecognizable voice input of unregistered word according to input-frequency of the unregistered word. In other words, the speech-input device can changeably make an adaptive response to a voice input of an unregistered word according to input-frequency of the word, thus avoiding interruption of control processing operation every time the user utters a meaningless word or habitual phrase by voice and the repeat of the same straining warning message informing the user of the impossibility of recognition and requesting correct inputting.

What is claimed is:

1. A speech input control device having a speech recognition processing portion for extracting a feature of each word inputted by voice, comparing the extracted feature of each input word with stored features of previously registered words in a voice word dictionary, recognizing the input word by its similarity to the registered word and giving a control instruction to an objective device to be controlled, an improvement comprising providing the device with unregistered word detecting means for detecting a word that is included in an input speech and has not yet been registered in the voice word dictionary, storing means for storing the detected unregistered word inputted by voice together with its feature pattern, input-frequency counting means for counting an input frequency of each unregistered word and renewably storing the counted input-frequency of each unregistered word, and response message changing means for changing a responding program according to the counted input-frequency of an inputted unregistered word when said word is inputted.

2. A speech input control device as defined in claim 1, characterized in that the response message changing means gives a full warning message in response to a voice input of an unregistered word whose input-frequency is less than a preset minimal frequency threshold, neglects, not giving any response message, a voice input of an unregistered word whose frequency exceeds a preset maximal threshold, and gives a simple warning message in response to a voice input of an unregistered word whose input-frequency is more than the minimal threshold and less than the maximal threshold.

* * * * *